United States Patent
Sarmiento Penuela et al.

(10) Patent No.: US 9,719,445 B2
(45) Date of Patent: Aug. 1, 2017

(54) LAMBDA VIRTUAL SENSOR SYSTEMS AND METHODS FOR A COMBUSTION ENGINE

(71) Applicant: General Electric Company, Schenectady, NY (US)

(72) Inventors: Oscar Eduardo Sarmiento Penuela, Nuremberg (DE); Medy Satria, Munich (DE); Johannes Huber, Kramsach (AT); Prashant Srinivasan, Bangalore (IN)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 14/823,806

(22) Filed: Aug. 11, 2015

(65) Prior Publication Data

US 2017/0045010 A1 Feb. 16, 2017

(51) Int. Cl.
*F02D 41/14* (2006.01)
*F02M 35/10* (2006.01)
(Continued)

(52) U.S. Cl.
CPC .......... *F02D 41/1402* (2013.01); *F02B 63/04* (2013.01); *F02D 19/02* (2013.01); *F02D 41/144* (2013.01); *F02D 41/182* (2013.01); *F02M 35/1038* (2013.01); *F02M 35/10386* (2013.01); *H02K 7/1815* (2013.01); *H02P 9/04* (2013.01);
(Continued)

(58) Field of Classification Search
CPC .. F02D 41/14; F02D 41/1402; F02D 41/0027; F02D 41/144; F02D 41/182; F02D 19/02; F02M 35/10; F02M 35/1038; F02M 35/10386; F02B 63/04
See application file for complete search history.

(56) References Cited

U.S. PATENT DOCUMENTS 4,576,136 A * 3/1986 Yamauchi ............... F02D 41/36
123/478
8,267,069 B2 * 9/2012 Hsia ....................... F02D 41/005
123/568.11

(Continued)

FOREIGN PATENT DOCUMENTS

| EP | 1158149 A1 | 11/2001 |
| EP | 1878900 A2 | 1/2008 |

(Continued)

OTHER PUBLICATIONS

Chiang, C.J. et al.,"Control of Thermal Ignition in Gasoline Engines", 2005 American Control Conference, vol. 6, pp. 3847-3852, 2005.

(Continued)

*Primary Examiner* — Hieu T Vo
(74) *Attorney, Agent, or Firm* — Fletcher Yoder, P.C.

(57) ABSTRACT

In one embodiment, a method includes receiving, via a first sensor, a signal representative of at least one of a manifold pressure, a manifold temperature, or a manifold mass flow rate of a manifold. The method further includes deriving, via a manifold model and the first sensor signal, a gas concentration measurement at a first manifold section of the manifold. The method additionally includes applying the gas concentration measurement during operations of an engine, wherein the manifold is fluidly coupled to the engine.

19 Claims, 4 Drawing Sheets

(51) Int. Cl.
*F02D 41/18* (2006.01)
*F02B 63/04* (2006.01)
*H02K 7/18* (2006.01)
*H02P 9/04* (2006.01)
*F02D 19/02* (2006.01)
*F02D 23/00* (2006.01)
*F02D 41/00* (2006.01)

(52) U.S. Cl.
CPC .......... *F02D 23/00* (2013.01); *F02D 41/0027* (2013.01); *F02D 2041/1416* (2013.01); *F02D 2041/1417* (2013.01); *F02D 2200/0402* (2013.01)

(56) References Cited

U.S. PATENT DOCUMENTS

| | | | |
|---|---|---|---|
| 8,985,088 B2 * | 3/2015 | Blythe | F02D 41/1497 123/198 F |
| 2012/0109499 A1 | 5/2012 | Klaeser-Jenewein et al. | |
| 2014/0033705 A1 * | 2/2014 | Blythe | F02D 41/0065 60/605.2 |
| 2015/0068505 A1 | 3/2015 | Iwase et al. | |

FOREIGN PATENT DOCUMENTS

| | | |
|---|---|---|
| EP | 2650516 A | 10/2013 |
| EP | 2824304 A1 | 1/2015 |
| WO | 2009040058 A1 | 4/2009 |
| WO | 2014154312 A1 | 10/2014 |

OTHER PUBLICATIONS

Barghi, F. "An Intelligent Control Policy for Fuel Injection Control of Si Engines", (case study: CNG engine) Intelligent Engineering Systems (INES), 2011 15th IEEE International Conference, pp. 115-119, 2011.

Kiaohong, et al.,"Lyapunov-design of Adaptive Air-Fuel Ratio Control for Gasoline Engines based on Mean-Value Model", Control Conference (CCC), 2011 30th Chinese Publication Year, pp. 6146-6150, 2011.

International Search Report and Written Opinion issued in connection with corresponding PCT Application No. PCT/US2016/040929 on Oct. 27, 2016.

* cited by examiner

LAMBDA VIRTUAL SENSOR SYSTEMS AND METHODS FOR A COMBUSTION ENGINE

BACKGROUND

The subject matter disclosed herein relates to combustion engines, and more specifically, to lambda or oxygen virtual sensor systems and method applied to combustion engines.

Combustion engines will typically combust a carbonaceous fuel, such as natural gas, gasoline, diesel, and the like, and use the corresponding expansion of high temperature and pressure gases to apply a force to certain components of the engine, e.g., piston, to move the components over a distance. Accordingly, the carbonaceous fuel is transformed into mechanical motion, useful in driving a load. The load may be a generator that produces electric power. The engine may use an oxidizer, e.g., air, to mix with the carbonaceous fuel for the combustion process. The oxidizer-fuel mix may traverse a manifold to be combusted inside a combustor. It would be beneficial to improve measurement of the oxidizer-fuel mix.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method includes receiving, via a first sensor, a signal representative of at least one of a manifold pressure, a manifold temperature, or a manifold mass flow rate of a manifold. The method further includes deriving, via a manifold model and the first sensor signal, an gas concentration measurement at a first manifold section of the manifold. The method additionally includes applying the gas concentration measurement during operations of an engine, wherein the manifold is fluidly coupled to the engine.

In a second embodiment, an system includes an engine control system comprising a processor configured to receive, via a first sensor, a signal representative of at least one of a manifold pressure, a manifold temperature, or a manifold mass flow rate of a manifold. The processor is further configured to derive, via a manifold model and the first sensor signal, a gas concentration measurement at a first manifold section of the manifold. The processor is additionally configured to apply the gas concentration measurement during operations of an engine, wherein the manifold is fluidly coupled to the engine.

In a third embodiment, a tangible, non-transitory computer readable medium includes code configured to receive, via a first sensor, a signal representative of at least one of a manifold pressure, a manifold temperature, or a manifold mass flow rate of a manifold. The code is further configured to derive, via a manifold model and the first sensor signal, an oxygen concentration measurement at a first manifold section of the manifold. The code is additionally configured to apply the gas concentration measurement during operations of an engine, wherein the manifold is fluidly coupled to the engine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
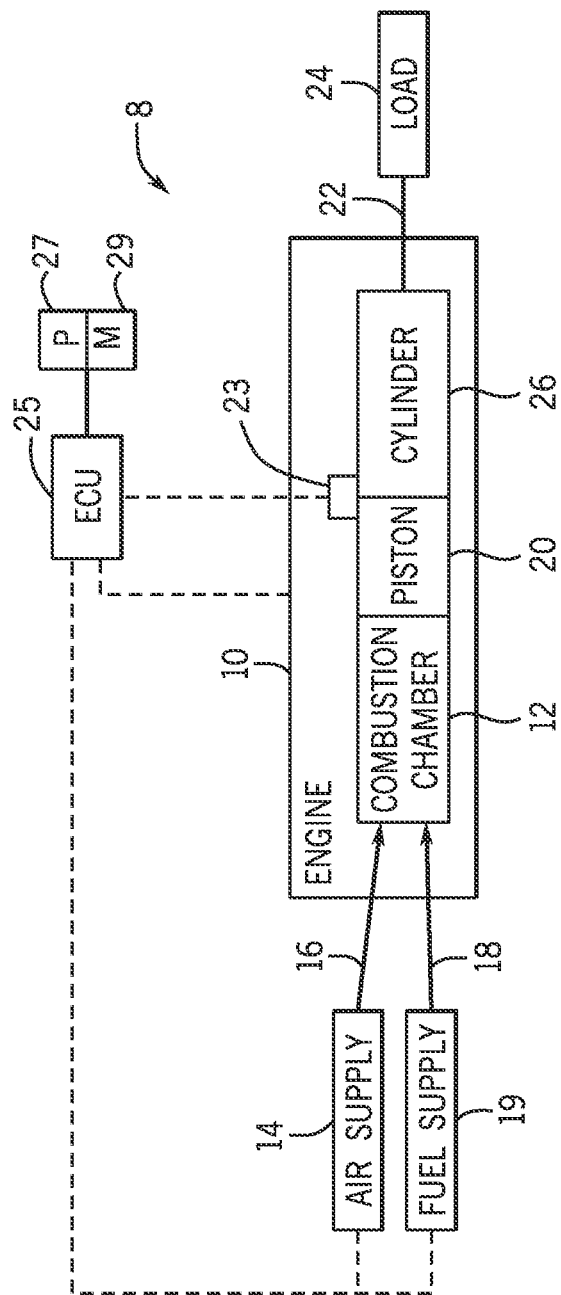
FIG. 1 is a block diagram of an embodiment of a power production system including an internal combustion engine.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The techniques described herein include the creation and use of a fluid (e.g., gas) concentration model that may predict engine inlet conditions for a variety of combustion engines, including pre-mixed multi-staged turbocharged gas engines that may be equipped with a mixture recirculation valve (e.g., compressor bypass valve). The model may use non-invasive measurements along a charging path, e.g., pressure measurements, temperature measurements, turbocharger speed and gas mass flow, to estimate a gas concentration in manifolds. In particular, the model may account for changes in gas concentration in manifolds having gas recirculation, e.g., compressor bypass, and may derive a time-dependant expression for the gas propagation along the manifolds.

Advantageously, the model need not use measurements during or after combustion to derive the gas propagation metrics. Indeed, the model may provide for a virtual lambda sensor, e.g., oxygen proportion sensor, that may be used in lieu of or additional to a physical lambda sensor. The virtual lambda sensor may be useful for fault tolerant engine controllers, enabling the control of the engine even in circumstances where the physical lambda sensor is not working as desired. The virtual lambda sensor may additionally improve simulation of power systems that include a simulated combustion engine subsystem.

In one embodiment, a system may include an "observer" system based on a Kalman filter that may provide for a recursive computable solution to estimate the state of the oxidizer-fuel mix, for example, the state of the oxidizer-fuel mix at the inlet of a combustion chamber. The observer system may also be used to enhance control of engine systems, for example, by providing for control decisions based on the predicted oxygen concentrations that may improve engine performance.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders. In some such cases, the cylinders and/or the pistons 20 may have a diameter of between approximately 13.5l-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example. Additionally or alternatively, one or more physical sensors 23 may be disposed at various locations of the engine system 8, such as in manifolds, exhaust ducts, and the like. Other sensors 23 may include pressure sensors, temperature sensors, mass flow sensors, and/or sensors measuring species concentrations (e.g., oxygen concentrations), which may be disposed at locations including manifolds, exhaust ducts, fuel and air delivery conduits, and the like. The sensors 23 may include lambda sensors, oxygen ratio sensors, oxygen percentage sensors, or a combination thereof. Various embodiments of the engine system 8 may be analyzed to derive certain properties, such as gas concentrations, pressures, flows (e.g., mass flows), temperatures, speed, and so on, using the techniques described herein. For example, FIG. 2 shows an embodiment of the engine system 8 that includes a pre-combustion compressor and an exhaust driven turbine.

Figure 2:
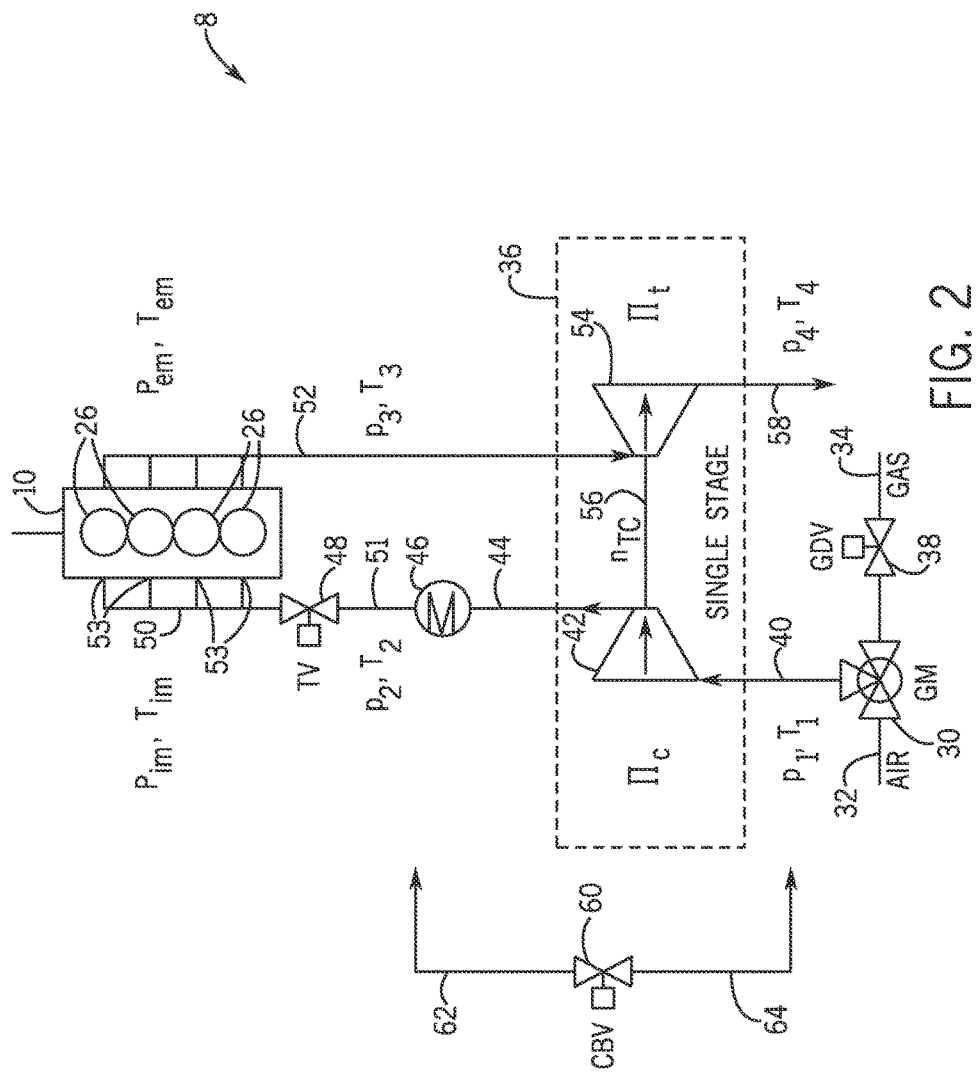
FIG. 2 is a block diagram of an embodiment of the internal combustion engine of FIG. 1, including a compressor bypass flow.

More specifically, FIG. 2 is a block diagram of an embodiment of the gas engine 10 including a gas mixer 30 that may intake air 32 and fuel gas 34 to produce a pre-mixed fuel. In the depicted embodiment, the engine system 8 includes a single stage turbocharged engine, e.g., engine 10 that is turbocharged via turbocharger system 36. A gas dosage valve 38 is also shown, used to deliver the gas fuel 34 into the gas mixer 30, to be mixed with the air 32. After the gas mixer 30, the pre-mixed fuel may travel through a manifold section 40 to a radial compressor 42 to be compressed, thus improving fuel burn. The compressed, pre-mixed fuel may have increased temperature during compression, and the compressed pre-mixed fuel may then travel through a manifold section 44 to an intercooler 46. The intercooler 46 may reduce the compressed pre-mixed fuel's temperature, improving energy efficiency. A throttle valve 48 may be used to provide the compressed premixed fuel to be combusted in cylinders 26 of the engine 10, which may then result in mechanical movement of the pistons 20. In the depicted embodiment, the throttle valve 48 is downstream of a manifold section 50, and upstream of a manifold section 51. Manifold sections 50 terminate at inlets 53. By modulating or driving the throttle valve 48 the ECU 25 may increase or decrease fuel flow into the cylinders 26 through manifold sections 50, thus increasing or decreasing engine speed (e.g., revolutions per minute [RPM], torque, and so on). The ECU 25 may include one or more processors 27 suitable for executing computer code or instructions, and a memory 29. The memory 29 may store the computer code or instructions as well as certain models and processes described in more detail below.

After combustion, exhaust may flow through exhaust manifold section 52 into a turbine 54, with enthalpy of the exhaust further used to provide rotative power to the turbine 54. The compressor 42 is mechanically coupled to the turbine 54 via a shaft 56, thus resulting in the turbocharger 36 (e.g., compressor 42, turbine 54, shaft 56) being suitable for using exhaust to compress the pre-mixed air-fuel mixture. The exhaust may then exit manifold section 58 for further processing, such as processing via a catalytic converter, to then be released to ambient.

Also depicted are a compressor bypass valve 60 disposed on bypass manifold sections 62, 64. In, use, the valve 60 may prevent undesired conditions, such as compressor 42 surge, by recirculating the pre-mixed air-fuel upstream of the compressor 42, such as from sections 42 and/or 46 into sections 40. The techniques described herein enable the creation of a virtual lambda sensor suitable for deriving, for example, gas as a percentage of the overall air-fuel mix, pressures (e.g., pressures p1, p2, p3, $p_{em}$, p4), temperatures (e.g., temperatures T1, T2, $T_{em}$, T4), mass flows, and the like, at various points through the manifold sections shown, such as sections 40, 44, 50, 51, and additionally sections 52, 58. As mentioned above, the sensor(s) 23 may be disposed in any one or more of the sections 40, 44, 50, 51, 52, 58, for example, to provide real measurements correlative to measurements derived via the techniques described herein.

Figure 3:
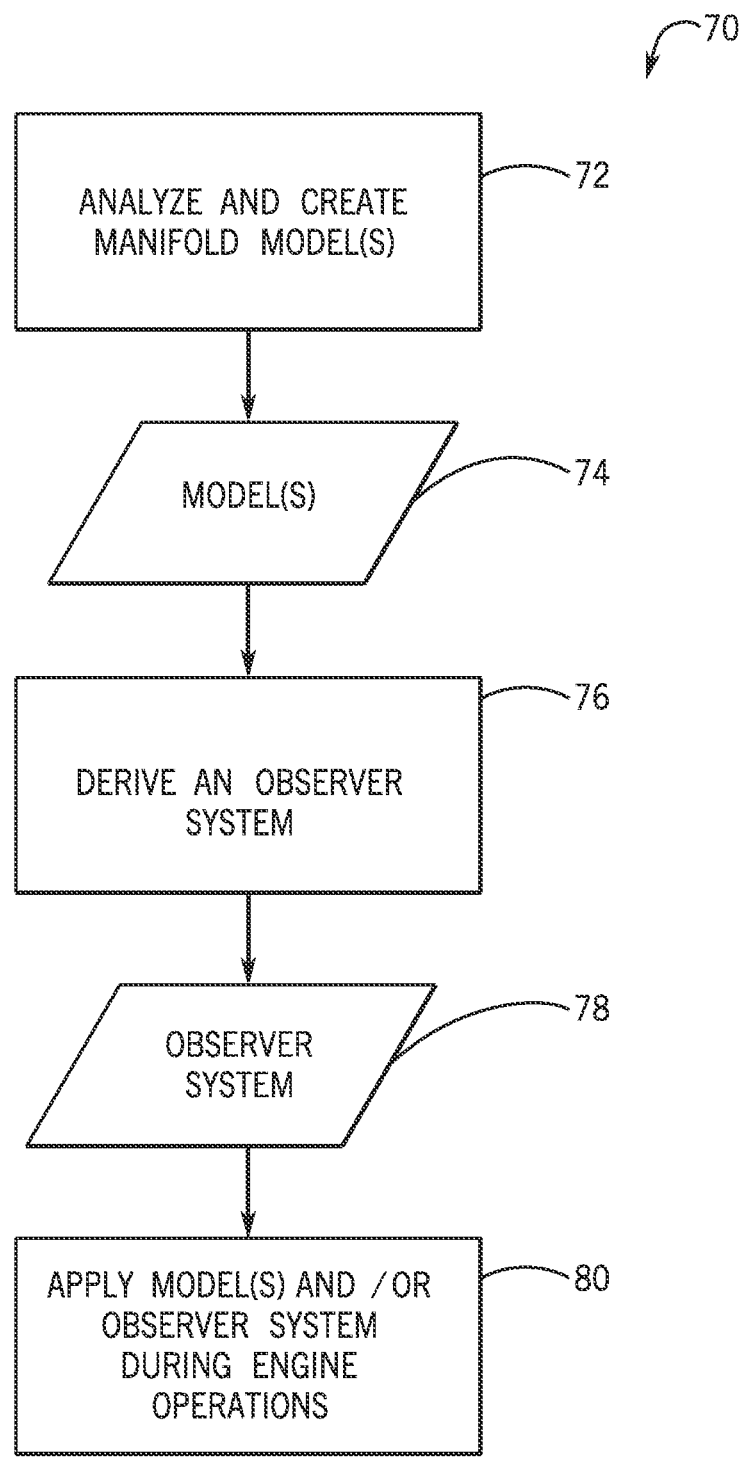
FIG. 3 is a flowchart of an embodiment of a process suitable for creating one or more manifold models for the internal combustion engine of FIG. 2.

As shown in flowchart form in FIG. 3, a process 70 may be used to derive a model suitable for deriving gas concentration and other properties (e.g., pressures, temperatures, mass flows) of the manifold sections 40, 44, 50, 51, 52, 58, 62, and/or 64. The process 70 may be implemented as computer executable code or instructions that may be stored in a memory (e.g., memory 29) of a computing device, such as the ECU 25, and may be executed by the processor 27. The process 70 may additionally or alternatively be stored and executed by a computing device such as a workstation, personal computer, server, mobile device, tablet, or a combination thereof. In the depicted embodiment, the process 70 may analyze (block 72) an engine system, such as the engine system 8 shown in FIG. 2. The analysis (block 72) may include a manifold modeling useful in capturing at least 1) a transport effect from the gas mixer 30 to the engine inlets 53 and 2) the effect of gas propagation through the manifolds sections 40, 44, 50, 51, 52, 58, 62, and/or 64. In one example, a magnitude of a time delay from the gas mixer 30 to the inlets 53 is given by flow speed, which varies with the engine 10 load. The time delay on a transfer function introduces a phase lag that grows linearly with the frequency and is proportional to its magnitude. For a time delay t, a frequency phase plot is shifted by wt radians. The larger the magnitude of the time delay t, the smaller the stability margins.

The gas propagation through the manifold sections 40, 44, 50 is impacted by the mass flow recirculation from the engine inlets 53 to the compressor 42 inlet. The gas concentration at the compressor 42 inlet results from the mixture flow originated at gas mixer 30 and the recirculating flow thought the compressor bypass valve 60. The compressor bypass 60 mass flow may thus act as a damper with a damping ratio $\xi$. At high flow speeds, the magnitude of $\xi<1$ while at low flow speeds, $\xi>1$. The variation of the damping ratio $\xi$ over the load results on a transition from complex poles to real poles as the load increases. Due to the high coupling gain between the compressor bypass 60, throttle valve 48 and gas dosage 38, this gain effect leads to a limit cycle during transient operation as the system poles move towards a stability limit axis as $\xi$ grows. Model(s) 74 may then be developed to account for gas transport and to develop control strategies for gas dosage 34 and turbocharger 36 control.

From the ideal gas law (e.g., PV=nRT, where P is pressure, V is volume, n is an amount in moles, R is an ideal gas constant, and T is temperature) the total pressure in the manifold sections desired to be modeled (e.g., 40, 44, 50, 51, 52, 58, 62, and/or 64) can be derived using Dalton's law for not reacting mixtures as follows:

$$P_m V_m = \frac{m_m}{M_{eq}} RT_m = \frac{m_{air}}{M_{air}} RT_m + \frac{m_{gas}}{M_{gas}} RT_m \qquad \text{Equation (1)}$$

Given that the molecular weights of air and gas are comparable, complete mixing of gas and air in the manifold may be assumed. In that case the amount of air and gas leaving the manifold would have the same ratio as that of the mass of air and gas in the manifold at any time, thus:

The manifold dynamics may include a filling emptying dynamics that may govern the pressure in the manifold. The total manifold pressure is used as state variable in an air-path model. This state variable can be accurately measured. The gas fraction relates the gas mass to the total mass in the manifold.

The gas fraction rate is given as function of the gas and total inlet gas flows and the air molar mass.

$$\dot{c}_{gas} = \frac{RT_m}{M_{air}V_m p_m}(\dot{m}_{gas,i} - c_{gas}\dot{m}_i) \qquad \text{Equation (2)}$$

The total pressure in the manifolds can be expressed as follows:

$$\dot{p}_m = \frac{RT_m}{M_{air}V_m}[(1 + M_g c_{gas,i})\dot{m}_i - (1 - M_g c_{gas})\dot{m}_o] \qquad \text{Equation (3)}$$

Equations (2) and (3) constitute a differential equation system suitable for deriving the manifold pressure and gas fraction, which may be used as one or more of the model(s) 74.

Since the gas and air temperature flowing in the manifold may differ, the previous differential equation system may be extended by including a quasi-static temperature gradient as a function of the mass flows. This form can be developed balancing the heat flow in the manifold including the wall transfer (e.g., wall of the manifold sections 40, 44, 50, 51, 52, 58, 62, and/or 64).

$$\dot{T}_m = \frac{RT_m}{M_{air}V_m p_m}(1 + M_g c_{gas})(T_i \dot{m}_i - T_m \dot{m}_o) \qquad \text{Equation (4)}$$

Extending the number of inputs a and outputs b the manifold dynamics for gas fraction and total pressure can be expressed as follows:

$$\dot{p}_m = \frac{RT_m}{M_{air}V_m}\left[\sum_{i=1}^{a} \dot{m}_i + M_g \sum_{i=1}^{a} c_{gas,i}\dot{m}_i - \sum_{j=1}^{b} \dot{m}_j - M_g c_{gas,i}\sum_{j=1}^{b} \dot{m}_j\right] \qquad \text{Equation (5)}$$

$$\dot{c}_{gas} = \frac{RT_m}{M_{air}V_m p_m}\left[\sum_{i=1}^{a} \dot{m}_i + c_{gas,i} - c_{gas}\sum_{i=1}^{a} c_{gas,i}\dot{m}_i\right] \qquad \text{Equation (6)}$$

$$\dot{T}_m = \frac{RT_m}{M_{air}V_m p_m}(1 + M_g c_{gas})\left[\sum_{i=1}^{a} \dot{m}_i T_i - T_m \sum_{j=1}^{b} \dot{m}_j\right] \qquad \text{Equation (7)}$$

The differential equation system (33) reveals that when making the gas fraction equal zero, the differential system equation can be simplified for the case of air charged engines (e.g. engine system 8 as shown in FIG. 2).

$$\dot{p}_m = \frac{RT_m}{M_{air}V_m}\left[\sum_{i=1}^{a} \dot{m}_i - \sum_{i=1}^{b} \dot{m}_j\right] \qquad \text{Equation (8)}$$

$$\dot{T}_m = \frac{RT_m}{M_{air}V_m p_m}\left[\sum_{i=1}^{a}\dot{m}_i T_i - T_m \sum_{j=1}^{b}\dot{m}_j\right] \quad \text{Equation (9)}$$

As shown, any of the equations (1)-(9) may be included in the one or more models 74, for example, to derive desired quantities, e.g., pressure, temperature, mass flow, and/or oxygen concentration c at one or more of the manifold sections. Indeed, by executing the model(s) 74, a virtual gas concentration sensor may be provided, suitable for measuring gas concentrations in any one or more of the manifold sections 40, 44, 50, 51, 52, 58, 62, and/or 64.

The process 70 may additionally or alternatively derive (block 76) an observer system, such as an observer system 78 that includes a Kalman filter. The observer system 78 may be implemented in hardware or in software. In a software example, the observer system 78 may be stored in the memory 29 and executed by the processor(s) 27. In one example, the observer system 78 may observe physical measurement obtained via the sensor(s) 23 and use the model(s) 74 to adjust the observation during engine control. Indeed, the observer system 78 may more optimally estimate or infer parameters of interest (e.g., gas concentrations, pressure, temperature, mass flow) from observations of the sensors(s) 23 and/or from derivations provided by the models 74, and then derive future states of the engine system 8. The derived future states may then be used, for example, to more efficiently and accurately monitor and/or control (block 80) operations of the engine system 8.

Figure 4:
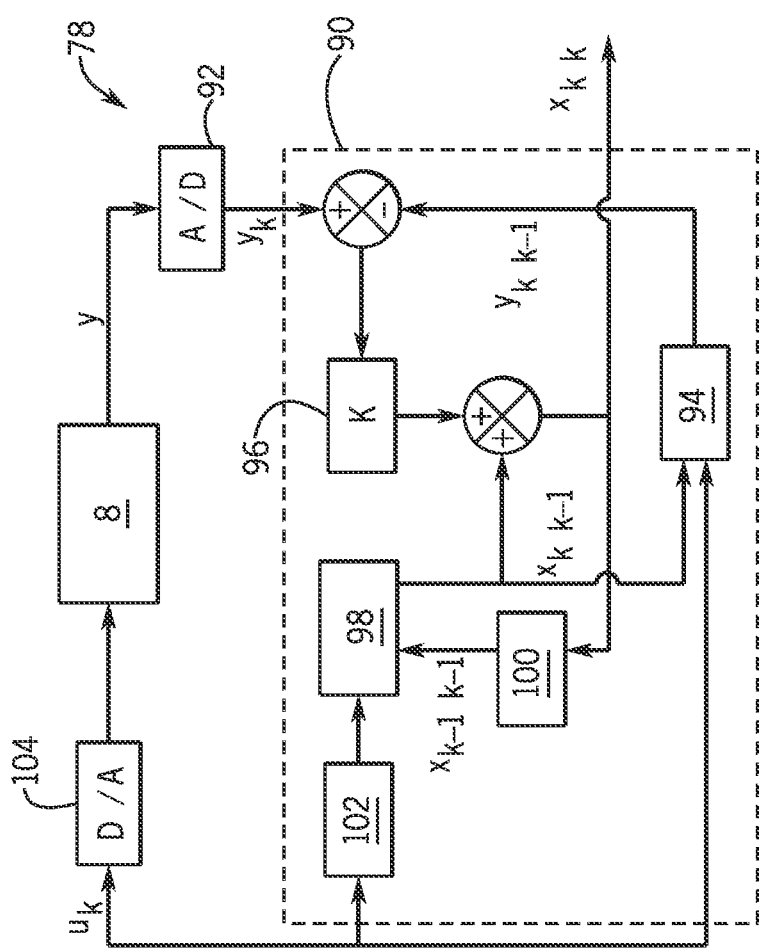
FIG. 4 is a block diagram of an embodiment of an observer system suitable for observing and controlling aspects of the engine show in FIGS. 1 and 2.

Turning now to FIG. 4, the figure illustrates an embodiment of the observer system 78 including an Extended Kalman Filter (EKF) system 90. The "extended" portion of the EKF system 90 may be more suitable for analyzing non-linear data, unlike traditional Kalman filter techniques. The observer system 78 may monitor and estimate the operation of the engine system 8. In particular, the observer system 78 may estimate and monitor gas concentrations at one or more manifold sections 40, 44, 50, 51, 52, 58, 62, and/or 64, as well as pressures, temperatures, and/or mass flows at the manifold sections 40, 44, 50, 51, 52, 58, 62, and/or 64. For example, engine system 8 receives suitable oxidant 32 and fuel 34, which it then mixes and combusts to achieve a desired air to fuel (AFR) ratio. Depending on the engine system 8 mode or operation or embodiment, the AFR ratio may provide for a stoichiometric combustion, e.g., combustion that results in just enough oxidant 32 to substantially burn all of the fuel 34. Other applications may keep the AFR in a range between rich (i.e., excess fuel 34 ) and lean (i.e., excess oxidant 32). During operations, the compressor bypass valve 60 may be modulated, for example, to recirculate the pre-mixed air-fuel upstream of the compressor 42, such as from sections 42 and/or 46 into sections 40 shown in FIG. 2.

It would be beneficial to predict future and/or current states or conditions of the engine system 8 based on the fluid flows through manifold sections 40, 44, 50, 51, 52, 58, 62, and/or 64, fuel delivery, air delivery, desired engine speed, desired engine torque, and so on. To that end, output signals y representative of sensors 23 as well as other sensors (e.g., fuel delivery sensors, air delivery sensors, pressure sensors, temperature sensors, engine speed sensors, engine torque sensors) may be processed by an A/D converter 92 into values $y_k$ may be used to as one input or feedback to the EKF system 90. In one embodiment, $y=[p_{2s}, P_e, \omega_e]^T$, where $p_{2s}$ is representative of pressure in manifold section 50 (e.g., inlet manifold), $P_e$ is representative of a electric power produced by an electric generator (e.g., load 24) that is mechanically coupled to the engine 10 and used to provide the electric power during engine system 8 operations, $\omega_e$ is correlative to engine 10 speed, and T is time.

In the depicted example, $y_k$ may be summed while an output of observation h block 94 (e.g., output of $h(\hat{X}_{k|k-1}, u_k)$) may be subtracted to arrive at a value K (shown via element number 96), e.g., optimal Kalman gain with updates. $\hat{X}$ may represent an estimated value (e.g., gas concentration, temperature, mass flow, pressure) arrived at via the models 74. The value K may then be summed with an output of an $f_d$ block 98 (e.g., $f_d(\hat{X}_{k-1|k-1}, u_{k-1})$), the sum which may then be used an input to block 100 (e.g., $z^{-1}$, representative of the square root of an observation of the true state), as well as to the block 94. $u_k$ may also be used as input to a block 102 (e.g., $z^{-1}$) which may provide its output to block 98. $u_k$ may be representative of engine system 8 inputs (e.g. control inputs), such as fuel flow, air flow, desired gas concentration, desired engine speed, and so on. Accordingly, $u_k$ may be converted into analog signals via D/A converter 104 and used to control the engine system 8.

In one embodiment, $u=[W_{gas}, u_{TV}, u_{BP}, ZZP]^T$, where $W_{gas}$ is desired gas flow, $u_{TV}$ and $u_{BP}$ are representative of control inputs to the TV valve 48 and CBV valve 60, respectively, and ZZP is representative of a spark ignition timing point (in crank angle degrees before top dead center (TDC) of the engine system 8.

In one embodiment, the observer system 78 may derive x estimated states for the single stage turbocharger 36 embodiment of FIG. 2, $x=[c_{g1}, p_2, c_{g2}, p_{2s}, c_{g2s}, p_3, \omega_{TC}, \omega_e]^T$, where $c_{g1}$ may be representative of gas concentration at, e.g., manifold section 40, $p_2$ may be representative of pressure at, e.g., manifold section 51, $c_{g2}$ may be representative of gas concentration at, e.g., manifold section 51, $p_{2s}$ may be representative of pressure at, e.g., manifold section 50 (e.g., inlet manifold), $c_{g2s}$ may be representative of gas concentration at, e.g., manifold section 50 (e.g., inlet manifold), $p_3$ may be representative of pressure at, e.g., manifold section 52, $\omega_{TC}$ may be representative of turbocharger 36 speed, and $\omega_e$ may be representative of engine 10 speed. Indeed, the observer system 78 may derive a variety of states at time T that may include predicted gas concentrations, pressures, and speeds, as desired. In one embodiment, the observer system 78 may also be used to provide a virtual lambda sensor suitable for deriving a lambda λ:

$$\lambda_{2s} = \frac{1 - c_{g2s}}{c_{g2s}AFR_s} \quad \text{Equation (10)}$$

$AFR_s$ is the stoichiometric AFR of the combustions processing occurring during engine system 8 operations. By recursively sampling sensor 23 data and applying model(s) 74 to derive predict and derive estimates states x, the techniques described herein may more accurately estimate changes in the engine system 8, for example due to CBV valve 60 modulation, GM valve 30 modulation, GDV valve 38 modulation, and/or TV valve 48 modulation, among others. For example, gas concentration may be more easily controlled by predicting lambda λ, thus achieving a more accurate stoichiometric combustion, lean combustion, and/or rich combustion. Additionally or alternatively, the techniques described herein may provide for enhanced reliability by providing a virtual lambda sensor that may be used to confirm data received from a physical lambda sensor and/or to add a second data stream to the data received via physical sensor(s) 23.

It is to be noted that while the techniques presented herein are described in view of a single stage turbocharged engine, the techniques described herein may be applied to model and control other engine types. For example, multistage turbocharged engine (e.g., low pressure and high pressure stages) may be similarly modeled and controlled. Likewise, engines having the gas 34 delivered and mixed downstream of the turbocharger 36, including single stage and multistage turbocharged engines, may be modeled and controlled.

Technical effects of the invention include providing for a virtual lambda sensor that may aid in more accurately controlling a variety of engines including compressor recirculation. The techniques described herein may provide for a modeling process suitable for creating one or more manifold models that may be used to derive gas concentrations, pressures, temperature, and/or mass flows. The models may be applied to more accurately control engine systems. The techniques described herein may additionally provide for an Extended Kalman Filter (EKF) observer system that may predict certain engine system states (e.g., oxygen concentrations, pressure, temperatures, mass flows) and that may be used to derive the virtual lambda sensor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising
an engine control system comprising a processor configured to:
receive, via a first sensor, a signal representative of at least one of a manifold pressure, a manifold temperature, or a manifold mass flow rate of a manifold;
derive, via a manifold model and the first sensor signal, an oxygen concentration measurement at a first manifold section of the manifold; and
apply the gas concentration measurement during operations of an engine, wherein the manifold is fluidly coupled to the engine.

2. The system of claim 1, wherein the manifold model comprises a physics-based mass flow model accounting for a compressor bypass recirculating flow through the manifold, and wherein the manifold comprises a charging manifold fluidly coupled to an inlet of the engine and configured to provide fuel and an oxidant to the inlet.

3. The system of claim 1, wherein the oxygen concentration measurement comprises a lambda measurement $$\lambda_{2s} = \frac{1 - c_{g2s}}{c_{g2s} AFR_s},$$

wherein $c_{g2s}$ is representative of the gas concentration measurement derived via the manifold model and the first sensor signal and wherein $AFR_s$ is representative of the stoichiometric air to fuel ratio (AFR) of the engine.

4. The system of claim 1, wherein the processor is configured to execute a Kalman filter to derive one or more estimated states when deriving, via the manifold model, the oxygen concentration measurement, and wherein the one or more estimated states are applied for controlling the engine.

5. The system of claim 4, wherein the one or more estimated states comprise the gas concentration measurement, a pressure, an engine speed, a turbocharger speed, or a combination thereof.

6. A tangible, non-transitory computer readable medium storing code configured to:
receive, via a first sensor, a signal representative of at least one of a manifold pressure, a manifold temperature, or a manifold mass flow rate of a manifold;
derive, via a manifold model and the first sensor signal, a gas concentration measurement at a first manifold section of the manifold; and
apply the oxygen concentration measurement during operations of an engine, wherein the manifold is fluidly coupled to the engine.

7. The tangible, non-transitory computer readable medium of claim 6, wherein the oxygen concentration measurement comprises a lambda measurement.

8. The tangible, non-transitory computer readable medium of claim 6, wherein the code configured to derive, via the manifold model, the gas concentration measurement, comprises code configured to execute a Kalman filter to derive one or more estimated states.

9. The tangible, non-transitory computer readable medium of claim 8, comprising code configured to recursively apply an engine output y to derive the one or more estimated states, wherein the engine output y comprises at least one of an intake manifold pressure, an engine speed, a generator electrical power, or a combination thereof, and wherein the engine is mechanically coupled to an electrical generator to produce the generator electrical power during operations.

10. The tangible, non-transitory computer readable medium of claim 8, wherein the Kalman filter is configured to derive a control input u, and wherein applying the oxygen concentration measurement during operations of an engine comprises applying the control input u, to control the engine during operations.

11. A method, comprising:
receiving, via a first sensor, a signal representative of at least one of a manifold pressure, a manifold temperature, or a manifold mass flow rate of a manifold;
deriving, via a manifold model and the first sensor signal, a gas concentration measurement at a first manifold section of the manifold; and
applying the gas concentration measurement during operations of an engine, wherein the manifold is fluidly coupled to the engine.

12. The method of claim 11, wherein the manifold model comprises a physics-based mass flow model accounting for a compressor bypass recirculating flow through the manifold.

13. The method of claim 12, wherein the manifold comprises a charging manifold fluidly coupled to an inlet of the engine and configured to provide fuel and an oxidant to the inlet.

14. The method of claim 11, wherein the oxygen concentration measurement comprises a lambda measurement.

15. The method of claim 14, wherein the lambda measurement comprises a $$\lambda_{2s} = \frac{1 - c_{g2s}}{c_{g2s} AFR_s},$$

wherein $c_{g2s}$ is representative of the gas concentration measurement derived via the manifold model and the first sensor signal and wherein $AFR_s$ is representative of the stoichiometric air to fuel ratio (AFR) of the engine.

16. The method of claim 11, wherein deriving, via the manifold model, the oxygen concentration measurement, comprises executing a Kalman filter to derive one or more estimated states.

17. The method of claim 16, wherein the Kalman filter comprises an Extended Kalman Filter (EKF) configured to analyze non-linear data.

18. The method of claim 17, wherein the EKF is configured to derive a control input u comprising a desired gas flow, a throttle valve control input, a bypass valve control input, or a combination thereof, and wherein applying the oxygen concentration measurement during operations of an engine comprises applying the control input u, to control the engine during operations.

19. The method of claim 17, wherein the EKF is configured to recursively apply an engine output y to derive the one or more estimated states, wherein the engine output y comprises at least one of an intake manifold pressure, an engine speed, a generator electrical power, or a combination thereof, and wherein the engine is mechanically coupled to an electrical generator to produce the generator electrical power during operations.

\* \* \* \* \*